(12) United States Patent
Medgyesi et al.

(10) Patent No.: US 8,818,967 B2
(45) Date of Patent: Aug. 26, 2014

(54) METHOD FOR COMPRESSING IDENTIFIERS

(75) Inventors: Andreas Medgyesi, Munich (DE); Huy Pham Nguyen, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 13/517,314

(22) PCT Filed: Dec. 20, 2010

(86) PCT No.: PCT/EP2010/007803
§ 371 (c)(1),
(2), (4) Date: Jun. 20, 2012

(87) PCT Pub. No.: WO2011/085789
PCT Pub. Date: Jul. 21, 2011

(65) Prior Publication Data
US 2012/0259822 A1  Oct. 11, 2012

(30) Foreign Application Priority Data
Dec. 22, 2009 (DE) .......................... 10 2009 059939

(51) Int. Cl.
*G06F 17/30* (2006.01)

(52) U.S. Cl.
USPC ............................ 707/693; 711/103; 719/328

(58) Field of Classification Search
CPC ............................ G06F 9/445; G06F 9/44557
USPC ........... 707/693, 999.101; 717/127, 146, 148; 711/103; 719/328
See application file for complete search history.

(56) References Cited

U.S. PATENT DOCUMENTS

| | | | |
|---|---|---|---|
| 5,640,564 A | 6/1997 | Hamilton et al. | |
| 6,341,373 B1 * | 1/2002 | Shaw | 717/173 |
| 6,449,764 B1 * | 9/2002 | Sliger et al. | 717/170 |
| 6,750,791 B1 | 6/2004 | Liu | |
| 6,985,900 B2 * | 1/2006 | Codd et al. | 706/56 |
| 7,089,251 B1 * | 8/2006 | Ross | 1/1 |
| 7,190,284 B1 * | 3/2007 | Dye et al. | 341/51 |
| 7,289,497 B2 * | 10/2007 | Pelletier et al. | 370/389 |
| 7,370,120 B2 * | 5/2008 | Kirsch et al. | 709/246 |
| 7,549,147 B2 * | 6/2009 | Futoransky et al. | 717/155 |
| 8,370,398 B2 * | 2/2013 | Carter | 707/802 |
| 2002/0108054 A1 * | 8/2002 | Moore et al. | 713/200 |
| 2002/0129270 A1 * | 9/2002 | Grieb et al. | 713/200 |
| 2005/0223243 A1 * | 10/2005 | Moore et al. | 713/193 |
| 2010/0223237 A1 * | 9/2010 | Mishra et al. | 707/693 |
| 2012/0207303 A1 * | 8/2012 | Moskowitz et al. | 380/255 |

FOREIGN PATENT DOCUMENTS

EP  0943989 A2  9/1999
JP  2000259425 A  9/2000

OTHER PUBLICATIONS

International Search Report issued in PCT/EP2010/007803, dated Apr. 26, 2011.
Lindholm et al.,"The Java Virtual Machine Specification, Chapter 4: The class file format" (2nd Ed), 1999, pp. 93-174, XP007918079.
International Preliminary Report on Patentability issued in PCT/EP2010/007803, dated Jul. 10, 2012.

* cited by examiner

*Primary Examiner* — Debbie Le
(74) *Attorney, Agent, or Firm* — Workman Nydegger

(57) ABSTRACT

The invention relates to a method for compressing identifiers of program code elements in a portable data carrier, to a method for calling compressed identifiers, to a portable data carrier, and to a semiconductor chip having a memory area for storing the compressed identifiers.

10 Claims, 5 Drawing Sheets

| Index | Number of words | Compressed identifiers |
|---|---|---|
| [0] | 02 | 0000 0001 |
| [1] | 04 | 0000 0001 0002 0003 |
| [2] | 04 | 0000 0001 0004 0005 |
| [3] | 04 | 0000 0001 0004 0003 |
| [4] | 03 | 0000 0001 0005 |
| [5] | 03 | 0000 0001 0003 |

| IdentifierPart 1 | IdentifierPart 2 | IdentifierPart 3 | IdentifierPart 4 |

FIG. 4
(Prior Art)

IdentifierPart 1.IdentifierPart 2.Identifierpart3.IdentifierPart4

```
         java.io
         java.lang
         java.lang           .annotation
         java.rmi
         java.security
         java.util
    javacard.framework
    javacard.framework       .service
    javacard.security
   javacardx.apdu
   javacardx.biometry
   javacardx.crypto
   javacardx.external
   javacardx.facilities
   javacardx.framework
   javacardx.framework       .math
   javacardx.framework       .tlv
   javacardx.framework       .util
   javacardx.framework       .util              .intx
   javacardx.io
   javacardx.security
   javacardx.servlet         .http
       javax.microedition    .io
       javax.microedition    .pki
       javax.servlet
       javax.servlet         .http
```

FIG. 5
(Prior Art)

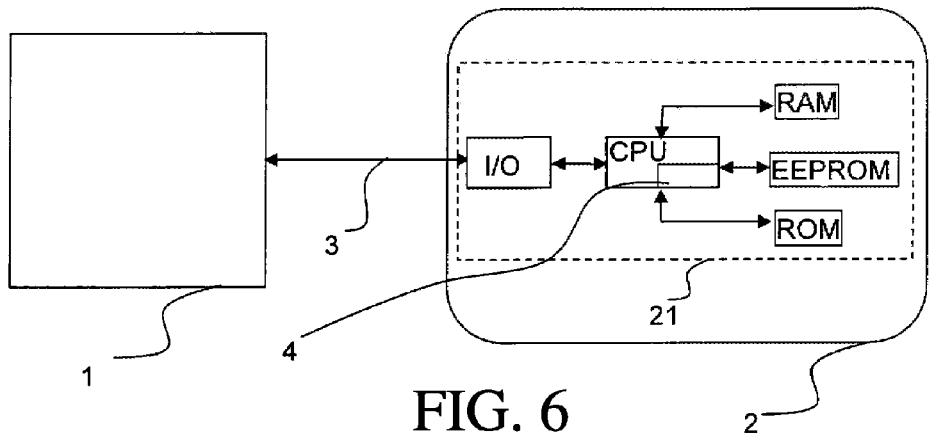

FIG. 6

| Original identifiers |
|---|
| java.io |
| java.lang |
| java.lang.annotation |
| java.rmi |
| java.security |
| java.util |
| javacard.framework |
| javacard.framework.service |
| javacard.security |
| javacardx.apdu |
| javacardx.biometry |
| javacardx.crypto |
| javacardx.external |
| javacardx.facilities |
| javacardx.framework |
| javacardx.framework.math |
| javacardx.framework.tlv |
| javacardx.framework.util |
| javacardx.framework.util.intx |
| javacardx.io |
| javacardx.security |
| javacardx.servlet.http |
| javax.microedition.io |
| javax.microedition.pki |
| javax.servlet |
| javax.servlet.http |

| Index | Size | Single word |
|---|---|---|
| 00 | 04 | java |
| 01 | 02 | io |
| 02 | 04 | lang |
| 03 | 10 | annotation |
| 04 | 03 | rmi |
| 05 | 08 | security |
| 06 | 04 | util |
| 07 | 08 | javacard |
| 08 | 09 | framework |
| 09 | 07 | service |
| 10 | 09 | javacardx |
| 11 | 04 | apdu |
| 12 | 08 | biometry |
| 13 | 06 | crypto |
| 14 | 04 | external |
| 15 | 10 | facilities |
| 16 | 04 | math |
| 17 | 03 | tlv |
| 18 | 04 | intx |
| 19 | 07 | servlet |
| 20 | 04 | http |
| 21 | 05 | javax |
| 22 | 12 | microedition |
| 23 | 03 | pki |

| Elements | Identifiers |
|---|---|
| 02 | 00 01 |
| 02 | 00 02 |
| 03 | 00 02 03 |
| 02 | 00 04 |
| 02 | 00 05 |
| 02 | 00 06 |
| 02 | 07 08 |
| 03 | 07 08 09 |
| 02 | 07 05 |
| 02 | 10 11 |
| 02 | 10 12 |
| 02 | 10 13 |
| 02 | 10 14 |
| 02 | 10 15 |
| 02 | 10 08 |
| 03 | 10 08 16 |
| 03 | 10 08 17 |
| 03 | 10 08 06 |
| 04 | 10 08 06 18 |
| 02 | 10 01 |
| 02 | 10 05 |
| 03 | 10 19 20 |
| 03 | 21 22 01 |
| 03 | 21 22 23 |
| 02 | 21 19 |
| 02 | 21 19 20 |

FIG. 7

```
HttpSession                       => Http Session
HttpSessionAttributeListener      => Http Session Attribute Listener
HttpSessionBindingEvent           => Http Session Binding Event
HttpSessionBindingListener        => Http Session Binding Listener
HttpSessionEvent                  => Http Session Event
HttpSessionListener               => Http Session Listener
ConstructedBERTag                 => Constructed BER Tag
ConstructedBERTLV                 => Constructed BERTLV
KoreanSEEDKey                     => Korean SEED Key
RSAPrivateCrtKey                  => RSA Private Crt Key
RSAPrivateKey                     => RSA Private Key
RSAPublicKey                      => RSA Public Key
```

FIG. 8

```
HttpSession                       0123
HttpSessionAttributeListener      7843
HttpSessionBindingEvent           5498
HttpSessionBindingListener        3321
HttpSessionEvent                  9845
HttpSessionListener               4561
```

FIG. 9

| Index | Length of words | Identifiers |
|---|---|---|
| [0] | 04 | Http |
| [1] | 07 | Session |
| [2] | 09 | Attribute |
| [3] | 08 | Listener |
| [4] | 07 | Binding |
| [5] | 05 | Event |

FIG. 10

| Index | Number of words | Compressed identifiers |
|---|---|---|
| [0] | 02 | 0000 0001 |
| [1] | 04 | 0000 0001 0002 0003 |
| [2] | 04 | 0000 0001 0004 0005 |
| [3] | 04 | 0000 0001 0004 0003 |
| [4] | 03 | 0000 0001 0005 |
| [5] | 03 | 0000 0001 0003 |

FIG. 11

METHOD FOR COMPRESSING IDENTIFIERS

BACKGROUND OF THE INVENTION

A. Field of the Invention

This invention relates to a method for compressing identifiers of program code elements in a portable data carrier, to a method for calling compressed identifiers, to a portable data carrier, and to a semiconductor chip having a memory area for storing the compressed identifiers.

B. Related Art

Chip cards having a microprocessor, also designated smart cards, are already used today, and will probably be used increasingly in the future, in a multiplicity of applications, for example in mobile devices such as e.g. mobile telephones as SIM cards or USIM cards, as bank cards or electronic purses in electronic payments, as health cards for persons having health insurance and for doctors, as citizen cards, or as multi-application cards in which several of the stated or other functionalities are implemented.

A semiconductor chip for the chip card has a plurality of memory areas, namely, the non-volatile, only once-writable ROM, the non-volatile, rewritable EEPROM and the volatile, rewritable RAM. Alternatively, parts of the ROM and/or of the EEPROM can be replaced by flash memories. In FIG. 1 these relations are represented. A chip card 2 is in a communication connection 3 with an end device 1 here.

Upon the manufacture of the semiconductor chip a program code portion is first implemented in the ROM by the chip manufacturer. This program code portion is also designated a ROM mask and contains primarily the operating system of the chip card. The chip-card manufacturer obtains the ROM mask from the chip manufacturer. The completion of the chip card is normally likewise carried out by the chip-card manufacturer, for which purpose additions to the operating system and applications of the chip-card manufacturer are implemented into the EEPROM of the chip card. After successful completion the semiconductor chip is ready to be delivered to the customer.

To create applications that are platform-independent and well protected from each other, it is very suitable to use object-oriented programming languages, in particular Java™ from the company Sun Microsystems Inc. Alternatively to Java™ a suitable programming language is also C#. However, the runtime environments of object-oriented programming languages are normally too extensive to be able to be readily implemented into a smart-card chip.

The Java Card™ technology of the company Sun Microsystems Inc. represents a modified Java technology for runtime environments with limited system resources, which is also suited for chip cards. This technology is set forth for example in the document "Java Card™ Runtime Environment (JCRE) Specification" in version 3. It is noted that the invention is not limited to the current or past versions of the specification, but rather is also valid for future versions. A schematic structure of the Java Card™ technology is shown in FIG. 2, which will be described more closely in the description of the figures. The runtime environment according to the JCRE specification, which is provided in the semiconductor chip of a Java Card, comprises at least the Java Card Virtual Machine (JCVM) and identifiers stored in a corresponding memory area, as well as optionally further components.

In connection with the invention, an identifier is an identifying means with which elements, for example a variable, a class, a method, a parameter list, a function or a package of a program code are labeled. To avoid collisions upon calling of this object, an identifier must be unique within a name space, i.e. it must be collision-resistant. Object-oriented programming languages distinguish between simple and fully qualified identifiers. A compiler always translates simple identifiers, which normally serve as programming aids, into fully qualified identifiers. A fully qualified identifier is constructed hierarchically, whereby individual parts are separated by a period. In Java there is a naming pattern for identifiers. Parts of the identifiers that are arranged lower down in the naming hierarchy have no relationship semantically to the parts of the identifiers that are higher up in the hierarchy.

In the chip card the identifiers are stored according to the specification as a character string, also called string, of characters of the data type character (char).

The memory area for the operating system of a chip card is normally very small, only a small part of which is available to a user. Hence, chip-card manufacturers always endeavor to increase the part of the memory area available to the user. To be able to make as much memory area as possible in the EEPROM or in the flash memory available to the user, the operating system of the chip card must hence be configured such that as little memory as possible is occupied.

Applications are normally implemented in the chip card in the form of applets. As applications there are so-called preloaded applets, which are implemented into the chip-card chip before or upon completion. Further, there are postloaded applets, which are loaded into the chip-card chip after successful completion, normally by the buyer or customer, for example a credit institution or a government agency. This is where the great advantage of the Java Card™ technology is to be seen, because the applets can be transferred to the chip card independently of platform, so that the hardware present on the respective chip card no longer plays a role upon implementation and execution of the applet. While in the Java Card 2.x applets are loaded, in the Java Card 3.0 so-called servlets and web services are additionally loaded. In connection with the invention no distinction is made between applets, servlets and web services, there is generally spoken of applications.

The invention is not limited to one version, for example the current version Java Card 3.0, of the standard, but rather the proposed compression method can also be applied to older and future Java standards. In the version of the Java Card standard 2.x the Java program code of an application is stored in the chip card in the form of Java packages. A Java package in turn consists of several class definitions. Additionally, interfaces can also be defined in the Java package. The Java program code is divided here over several translation units, each of which is stored in its own file. Each individual translation unit first defines the package to which it belongs and then imports one or several classes from other Java packages. Additionally, interfaces from other Java packages can also be imported. Finally, one or several classes and possibly additionally interfaces are defined in the Java package. One Java package draws on another Java package, so to speak. This measure prevents packages, classes and/or methods from existing on a chip card in multiple fashion, so that memory space on the chip card is already saved at this point.

That a package newly loaded into a Java Card can actually access a predetermined other package and use its program code is established by linking. The newly loaded package loads link information (e.g. an address) from an export component of the other package into its own import component. For example, a token, i.e. a number reference generated from an "import" reference, in the import component of the new package is replaced, upon linking, by an address from the export component of the other package. This causes the token (the reference) with the desire for use to be replaced by an actual address link between the two packages. The link and thus the actual possibility of use can only be established when the newly loaded package has available thereto the export component of the other package whose program code wants to use the new package.

The export components of all packages that are implemented in a Java Card, or a predetermined subset of all these export components, are combined in the export file. If an additional (new) package is transferred to the chip card before completion of the Java Card, it is linked employing the linker and the export file.

The structuring of the program code into packages is still retained after the transfer to the portable data carrier.

As mentioned at the outset, in the Java Card technology, identifiers for executable program code elements are stored in the chip card, whereby the identifier in turn states the package and the class name in which the executable program code is stored. The identifiers are stored here as so-called strings, in the character data type (char). Each char character of the string requires 8 bits in the memory area of the chip card. Hence, one starting point for saving memory space in the memory area of the chip card is attainable by effectively storing the identifiers on the chip card.

In JP 2000259425 A there is stated a method for compressing identifiers. The identifiers are first stored as strings of char and are analyzed with regard to redundant strings. Each string of a first identifier that is completely contained in a string of a second identifier is not stored separately. Instead, the first identifier is stored such that the first char character of the first identifier is marked on the string of the second identifier. The first identifier is discarded and only the marking and the length of the string of the first identifier is stored in the memory area of the chip card.

Such a compression initially means that at least one string of an identifier is completely stored. Each identifier of a Java package, of a class or of a method that has not previously been stored as a string of char at least once must be stored in the memory area of the chip card in the conventional way. Therefore, this compression method is not effective, since a lot of space is employed for the identifiers.

SUMMARY OF THE DISCLOSURE

The invention is hence based on the object of storing the identifiers on the chip card more effectively, that is, in a more space-saving manner. The share of redundant information in the string of the identifiers is hence to be substantially reduced. Furthermore, access times and method call times are to be minimized by the employment of compressed identifiers. It is a matter of course that calls of the identifiers must, in so doing, remain unique at all times.

According to the invention there is proposed a method for compressing an identifier of a program code element in a portable data carrier, in particular a Java Card. The method comprises the following method steps: First, the identifier in the portable data carrier is typed, whereby the identifier is at least of a first and a second identifier type. Subsequently, a first compression function is applied at least to parts of the identifier in type-dependent fashion and a compressed identifier obtained, whereby the applying is effected in the portable data carrier. Finally, the compressed identifier is stored in a memory area of the portable data carrier, whereby the compressed identifier can be called for executing the program code elements.

A compression function here is a function whose application to an identifier reduces the memory space requirement of the identifier. Thus, the compressed identifier has a lower space requirement in the chip card after the applying of the compression function.

The method of the invention applies a compression function in type-dependent fashion. It is thereby advantageously achieved that the compression function obtains an efficient memory space saving for the respective type. The kind of identifier type as well as the differences between the individual identifiers will be explained in the description of the figures. The compressed identifiers are additionally employed for carrying out comparisons, by which it is for example checked whether a certain identifier is already present on the chip card. Through the compression it is unnecessary to carry out elaborate string comparisons, also called string compares, but rather it is possible to apply substantially simpler search and compare algorithms. In particular, a binary search is to be applied within the compressed identifiers. Thus, in addition to the memory saving, the time for accessing a program code element callable by means of the identifier is also reduced.

Preferably, a first compression function is applied to the first identifier type. Further preferably, a second compression function is to be applied to the second identifier type. The first and second compression functions are based in particular on different mathematical functions. This identifier-type-dependent application of different compression functions advantageously leads to the respective identifier type being optimally compressed, with regard to the program code element that is called thereby.

As described above, an identifier is hierarchically structured and constructed of several parts, whereby mutually the parts are separated from each other by a period. A hierarchical construction of the identifiers is employed by Java and C#, inter alia. The identifiers can be constructed of a different number of parts of identifiers, whereby the individual identifier parts can be different identifier types.

In a special embodiment, the identifier is constructed according to the identifier naming convention of the Java Language Specification. This naming pattern prevents two identifiers from existing under the same name. Further, the naming convention prescribes how individual identifiers must be created, so that widely distributed identifiers describe a uniform name space. This makes it possible for identifiers to be separately, simply and automatically installed in a chip card and cataloged there. The construction and further examples of identifiers can be taken from the description of the figures. The naming convention further provides that the last identifier part can identify a class. Further, the naming convention provides that identifiers for methods and parameter lists are stated in separate strings.

Preferably, a lossy compression function is applied at least for a part of the first identifier type. This can be in particular a hash function. The lossy compression function compresses uniquely, i.e. in a collision-resistant manner, at least for a subset of the first identifier type. The requirements for the lossy compression function are low, this function must ensure the collision resistance of the compressed identifiers, so that upon compression the case is excluded that different identifiers are identical after compressing. A later call of the identifier would thus impair the functioning of the chip card.

Lossy in this connection means that the original string of char characters of the transferred identifier cannot be inferred starting out from the compressed identifiers. This is possible in particular when a constant set of the identifier of the first type is compressed, so that it is excluded that further identifiers of this identifier type are added or individual identifiers of this identifier type are overwritten or exchanged.

To carry out a collision-free lossy compression it is sufficient to predict a subset of expected identifiers that are transferred to the chip card at any time with a possible probability. For this subset there is now sought a lossy compression function which generates collision-resistant compressed identifiers. If identifiers not contained in the subset are transferred, either no, or a lossless, compression is effected on the chip card.

Otherwise the case could occur that an identifier has been lossily compressed and is overwritten in the course of the installation of an application. A collision upon calling of the identifier would be the consequence, because now two originally different identifiers have been mapped to an identical value by the lossy compression function. The call of the desired program code element could thus no longer be resolved uniquely, consequently a reliable operation of the chip card would be excluded.

A first type of identifier is for example an identifier by which Application Programming Interface (API) functions are called as executable program code elements. API functions are so-called standard library functions which are implemented into the chip-card chip before or upon completion by the chip-card manufacturer. These API functions are a part of the ROM mask to be implemented or are deposited in the EEPROM or flash memory.

A first identifier type can also comprise only a subset of the API functions. It is thereby achieved that the compressed identifiers are optimized for memory requirement. The lower number of identifiers additionally makes the compressed identifiers shorter. This in turn saves access time.

If the first type of identifier relates to the API functions, it is ensured that the number of functions is constant, because the Java API must not be supplemented by new functions according to the respective underlying Java standard. Alternatively, it is also possible that only a subset of the API functions is lossily compressed as the first identifier type. The greater the subset is, the more elaborate the compression will be and/or accordingly great the compressed identifiers will be. A selection of the subset can be made according to the number of API functions, according to the desired degree of compression, according to the frequency of access to this subset, etc.

It holds in general for this patent application that the compressing method is primarily intended to achieve a memory space saving. The access time can furthermore be shortened by a skillful choice of a subset of identifiers of an identifier type. Parameters for the choice of the compression function are therefore the number of identifiers, frequency of their call, is the identifier transferred again (and thereby optionally overwritten) or not.

Which part of an identifier is lossily compressed can depend on the identifier itself. This thus need not statically be a certain part of the identifier, but it might rather be a matter of finding a lossy compression that is as efficient as possible (with regard to memory space or access time).

Preferably, a second compression function is applied to the second identifier type. This second compression function is, in a special embodiment, a lossless compression function. Thus, the memory requirement of the second type of identifiers can be reduced, but it is ensured that the identifiers can be reconstructed from the compressed identifiers. This is important in particular when the identifier belongs to an identifier type that can be subsequently overwritten. In such a case it must remain ensured that the compressed identifier is collision-resistant, and a subsequently transferred identifier can also be stored in a collision-resistant manner.

The above conditions for the first and second compression functions mean that the degree of compression of the first compression function can be substantially higher compared with the second compression function, in order to be able to remove a large portion of redundant information from the identifiers.

The identifiers of the second identifier type are preferably stored in list form. In so doing, a first list and a second list are formed. The first list consists of single words of the identifier. These single words are stored as strings of char. Alternatively, the single words are not stored as strings, but rather the hash values of the single words. The second list consists of the number of parts of the identifier and indices for the corresponding parts of the identifier of the first list.

Because a multiplicity of identifiers on the chip card have at least partly matching strings, the identifiers are stored in a list form by the above-described method. By such a storing it is possible to a save a large portion of memory requirement of the identifiers.

Because the identifiers usually identify a class in the last part, it is provided according to the invention to compress this last part losslessly. This makes the call of this compressed identifier still unique.

A compressed identifier can call a package, a method, a class and/or a parameter list as a program code element. These are the most frequent identifiers that must be stored in the chip card, so that the compression of these identifiers saves especially much memory area on the chip card. The last part of the identifier possibly identifies a class here, whereas the remaining parts of the identifier identify the package. Methods and parameter lists can first be stored in strings that do not belong to the packages and classes.

Advantageously, it is achieved by the compression method that the chip card still matches the Java standard. That is to say, files are still transferred to the chip card by the Java standard. The invention is not limited to one version, for example the current version Java Card 3.0, of the standard, but rather the proposed compression method can also be applied to older and future Java standards. The compressing according to the invention is effected on the chip card, whereby the compressed identifiers are stored. The received identifiers can be discarded after successful compression, since due to the type-dependent compression it is achieved that all identifiers are stored in a collision-resistant manner. In particular, parts of the identifier of a type can be compressed lossily.

Further applications are subsequently transferred to the portable data carrier according to the Java Card standard either for completion of the chip card or according to the user's wishes. In so doing, identifiers are likewise transferred. These subsequently transferred identifiers are compressed in a collision-resistant manner with regard to already compressed identifiers. In this way it is possible to reload Java applications independently of platform without doubly storing identifiers.

Further, there is proposed according to the invention a method for calling a compressed identifier in the portable data carrier. With this method, exclusively the compressed identifiers are now required for calling program code elements. The transferred identifiers can be discarded after compression. In this way, the memory requirement of the identifiers is considerably reduced.

A program code element can in turn have an identifier of a program code element. This identifier in the program code element is likewise stored in a compressed manner.

Further, there is proposed a portable data carrier employing the compression method. As a portable data carrier there is proposed in particular a Java Card as a chip card. Alternatively, a security module, a token or a different data carrier employing the method is also conceivable and not excluded by the idea of the invention.

Finally, there is proposed a semiconductor chip for a portable data carrier, in particular a Java Card. The semiconductor chip has, inter alia, a central processing unit, a volatile and a non-volatile memory area. In the central processing unit there is provided a compression unit. The compression unit compresses the identifiers according to the described compression method. The compressed identifiers are stored in the volatile and/or non-volatile memory area of the data carrier.

DESCRIPTION OF THE DRAWINGS

Hereinafter the invention or further embodiments and advantages of the invention will be explained more closely with reference to figures, whereby the figures merely describe embodiment examples of the invention. Identical components in the figures are provided with identical reference signs. The figures are not to be considered true to scale, it may be that individual elements of the figures are represented in exaggeratedly large or exaggeratedly simplified form.

There are shown:

FIG. 4 construction of an identifier according to the prior art;

FIG. 5 list with exemplary identifiers;

FIG. 6 a block diagram of an embodiment example, according to the invention, of a semiconductor chip in a chip card;

FIG. 7 tables for contrasting identifiers transferred and identifiers compressed by a method according to the invention;

FIG. 8 list with identifiers, alternatively to FIG. 5;

FIG. 9 hash values for an extract of identifier parts of FIG. 8;

FIG. 10 a list with indices and length of the word for compressed storing on a chip card;

FIG. 11 list of compressed identifiers according to FIGS. 8, 9 and 10.

DETAILED DESCRIPTION OF PREFERRED EMBODIMENTS

Figure 1:
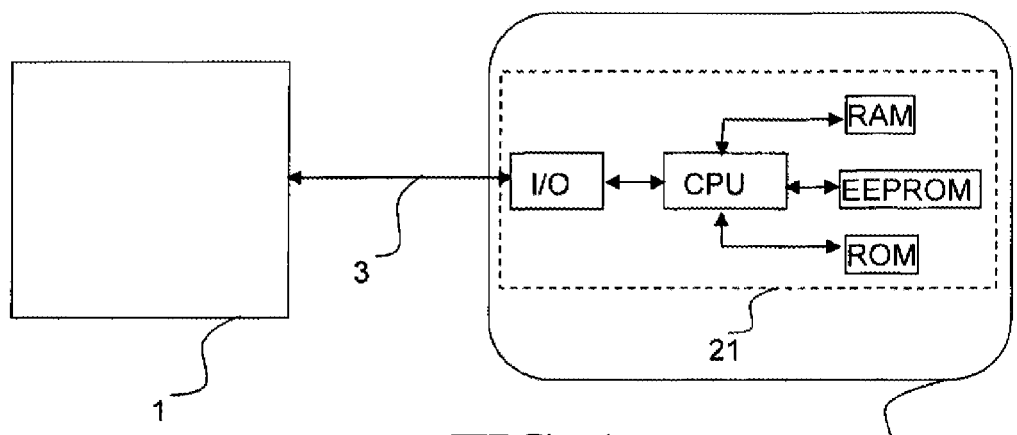
FIG. 1 an exemplary block diagram of a semiconductor chip of a chip card according to the prior art.

FIG. 1 shows a block diagram of a semiconductor chip 21 in a portable data carrier, configured here as a chip card 2, as is to be found in the prior art. An input/output unit I/O is connected here to a central processing unit CPU. Connected to the central processing unit is further a memory area, whereby the memory area consists of a non-volatile memory area, ROM, EEPROM and a volatile memory area RAM. In the RAM there are located short-lived volatile data, whereas in the ROM the operating system is burned in. In the EEPROM there are stored data that must be available over several card activations. Alternatively, a flash memory is provided as a memory area in the chip card.

The portable data carrier is connectable to an end device 1 via a communication connection 3. The configuration of the communication connection 3 is nonessential to this patent application. The portable data carrier is likewise unlimited in form and shape. In particular, the portable data carrier is a chip card 2 or a memory card. Alternatively, the central idea of this patent application likewise includes a token or a software-based structure, for example in the form of a security module or a security platform within an operating system.

Figure 2:
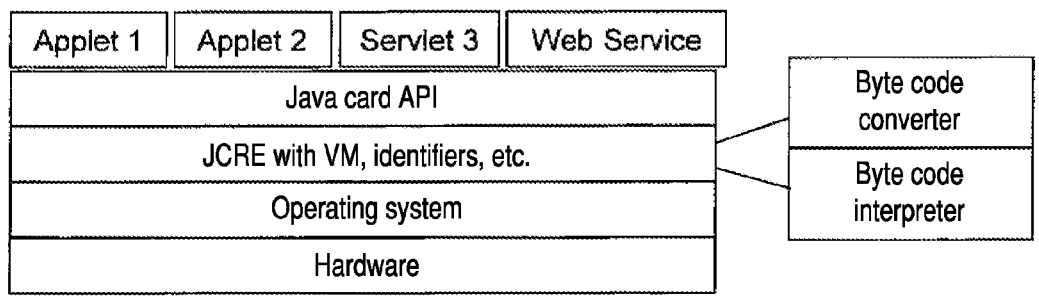
FIG. 2 a broadly outlined software structure of a Java implementation on a Java Card according to the prior art.

In FIG. 2 there is a structure that is implemented in the central processing unit CPU of a Java Card. The goal of Java Card is to produce a clear separation between operating system and applications. Additionally, the same application is to be usable on different cards in a cross-platform manner.

For this purpose, a structure according to FIG. 2 is implemented in the chip card. The operating system is first installed on the hardware. The above-described JCRE is formed from the JCVM, the API, and applications accessing the same. The JCVM in turn includes a byte code interpreter. The identifiers will be explained more closely hereinafter.

A created program source text of a predetermined program, for example of a program to be loaded onto a Java Card™, is, in the Java™ Card technology, first compiled by means of a compiler, so that there is generated a class file that has the format of an intermediate code, namely, of the Java byte code. This byte code is interpretable by the Virtual Java Machine (VM). Subsequently, in the Java™ Card technology, the byte code of the class file is additionally converted into a converted byte code by means of a converter. This compilation and conversion is carried out outside the Java Card and is not shown in FIG. 2.

In the Java Card 2.x the byte code is transferred to the Java Card in a cap file (cap=Card Application Protocol) via the communication connection 3 using an installation program on the end device 1. Subsequently, the byte code of the cap file is linked. Upon linking there are established, inter alia, possibilities for the program loaded onto the Java Card with the cap file to access other program code elements present in the Java Card, that is, there are established connections between the individual program code elements. Every Java Card includes API functions. These are the standard library of a Java Card and are already implemented into the Java Card upon manufacture of the chip card. Any program code elements can call these API functions.

It is pointed out once again that the proposed compression method can also be applied to older and future Java standards, whereby younger Java Card versions as of 3.0 transfer class names directly without the cap file format.

Figure 3:
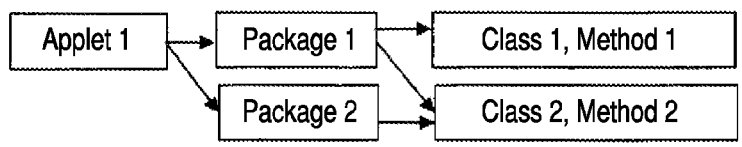
FIG. 3 a representation of a possible branching of identifiers within a Java application according to the prior art.

In FIG. 3 there is shown an exemplary link of different program code elements. These links are carried out upon linking. For this purpose, a loader states where the individual program code elements are to be found. A Java application Applet1 employs the two Java packages Package1 and Package2. The Package1 is newly transferred to the Java Card here, whereas Package2 is already present on the Java Card. Package1 comprises the class Class1 and the method Method1. Package2, on the other hand, comprises the class Class2 and the method Method2. Package1 now requires for carrying out the program code also Class2 of Package2. Because this Class2 is already implemented on the Java Card, Class2 of Package2 is pointed to upon calling of the Applet1. This pointing is made possible by identifiers. The identifiers indicate where the called program code element is located.

A schematic structure of the identifiers is shown in FIG. 4. The identifiers of object-oriented programming languages are constructed hierarchically. They consist of different identifier parts and are separated by a period.

The IdentifierPart1 of the identifier identifies the so-called top-level domain. This represents the highest level of the name space within an organization. The IdentifierPart2 is the domain of the organization. Finally, all subdomains are listed in reverse order, so that the organization can choose a certain name for its identifiers.

Expressed more concretely, it holds for the programming language Java that IdentifierPart1, IdentifierPart2 and/or IdentifierPart3 identifies the Java package, and IdentifierPart4 identifies a class of this Java package.

Alternatively, the identifier identifies a method and/or a parameter list. The length of the identifier is flexible here. The number of identifier parts is also flexible. If parts of the identifier identify a package, the last part of the identifier can identify a class. An identifier can consist in particular of parts of a first identifier type and parts of a second identifier type.

When Applet1 is loaded onto the chip card 2, the so-called loader of the chip card 2 checks whether the program code elements called by Applet1, e.g. classes, methods, packages, parameter lists, etc., are present on the chip card 2. Alternatively, Applet1 newly defines program code elements already present on the chip card 2. A new definition of a program code element means overwriting the already existing program code element in the semiconductor chip 21 of the chip card 2.

In both cases it is indispensable that it is uniquely known to the chip card 2 which program code element is already present. This is necessary because arbitrary program code elements with different identifiers can be added within the chip card 2.

If for example the organization GD in Canada makes available a package in which card data are computed, the IdentifierPart1 is ca, IdentifierPart2 gd, IdentifierPart3 carddata and IdentifierPart4 compute. All identifier parts are separated by periods, the identifier that calls the class compute is then ca.gd.carddata.compute. A class within a package of a U.S. organization GD that has likewise provided a package for card data computation is then called via the identifier us.gd.carddata.compute. Both identifiers define their classes in these two packages. They form a single name space of their own. It must be ensured within this defined name space that the program code elements in the card are properly linked.

In FIG. 5 there is given by way of example a list of 26 identifiers of packages as is conventionally stored in a chip card 2. Because these strings are constructed of words of char characters and each character requires 1 byte of memory space, 458 bytes of memory space are necessary for storing these 26 identifiers. There is often also stored, in addition to the identifiers, the so-called hash value of the identifiers in a 16 bit format, so that 510 bytes of memory must be expended for storing the 26 identifiers. As evident in FIG. 5, the identifiers of the 26 packages consist of a different number of identifier parts, concretely between two and four identifier parts.

The memory space in a chip card is enormously limited, nowadays typically 512 kB, so that a compression method is proposed here. For compressing the identifiers there are several aspects that must be taken into consideration, namely, the kind of compression, lossy or lossless, is a certain subset to be compressed, are the identifiers to be compressed completely or only parts thereof, how much access time is to be saved, and much more.

Attention must be paid to the following: Upon the application of a lossy compression function, collisions can occur upon the call of the corresponding program code element. This happens when the identifiers of two different program code elements are mapped to the same value by the lossy compression function. This can lead to a program code element being accidentally overwritten by a completely different program code element. This would make the chip card 2 useless, so that collisions on the chip card 2 must always be avoided.

By way of explanation, the search order for program code elements existing on the chip card 2 must first be described. The order is defined by the class loader hierarchy. In Java Card 3.0 the search takes place in four steps: First, the program code element to be called, e.g. a class, is searched in the program code element, e.g. a package, in which the calling program code element itself is located. If the program code element to be called does not exist, it is searched in the so-called extended libraries. If the program code element to be called does not exist there either, it is searched in the so-called shareable objects. If the program code element to be called does not exist there either, a search is finally done in the API functions, where the search will be successful at the latest.

An extended library with the identification com.gieseckedevrient.myClass is therefore overwritten by com.gieseckedevrient.myClass when the latter class is located in the same package as the calling class. A lossy compression, for example the applying of a hash function or of another algorithm to the string of the identifier, yields for example:

| | |
|---|---|
| com.gieseckedevrient.myclass | hash value: 1234, stored in extended libraries |

Coincidentally, the string

| | |
|---|---|
| com.anybodyelse.someotherclass | hash value: 1234, stored in the package | could yield the same hash value. Because exclusively the hash values would be employed for linking the program code elements, the program code element com.gieseckedevrient.myClass would be called at com.anybodyelse.someotherclass and thus the card would become useless.

API Functions under Java are subject to the requirement that they must not be overwritten. Thus, program code elements beginning with the identifier part java, javax, javacard, javacardx and com.sun are excepted from overwriting or replacement. These API functions form a first type of identifiers, for the purposes of the invention. Additionally, the API functions are firmly defined, i.e. no new program code elements are added within a Java version.

There thus results for identifiers whose identifier parts begin with one of the five portions java, javax, javacard, javacardx, com.sun the following possibility: At the time of development of the Java Card there is sought a compression function that compresses the identifiers of the Java API functions in a collision-resistant manner. Because no new Java API functions can be added to the delivered Java Card, no collisions can occur through subsequently transferred identifiers. Thus, the compression can be lossy and thus assume a very high degree of compression. The mapping of the compressed identifiers is nevertheless always unique.

Alternatively, it is of course also possible to compress only a subset of the identifiers of API functions, for example only identifiers of the API functions java and javax or only a subset of java and a subset of javax. Consequently, a lower number of identifiers is to be compressed, which leads to shorter compressed identifiers. These shorter compressed identifiers can be called faster as a result, so that access time is saved. A measure for selecting a subset is for example the frequency of calling of a certain API function.

If identifier parts do not belong to the set of API functions, collisions are avoided by the loader ascertaining the lossy compression in the program code elements to be loaded only for those parts of the identifiers that belong to the API functions. All other parts of the identifiers are then not compressed at all or compressed losslessly and stored. This is to be heeded in particular with identifiers whose last part calls a class as a program code element. Identifiers of class names are to be compressed losslessly.

The lossy compression is not bound to a special mathematical algorithm here. It must only fulfill the condition that the memory requirement of the compressed identifiers is lower than the memory requirement of the transferred identifiers. Preferably, the compressed identifier is accordingly short, so that the access times for the program code element are reduced (in comparison to the access time for program code elements by an uncompressed identifier).

A lossy compression is obtained for example by means of a hash function. There are a multiplicity of algorithms known from the prior art in this connection, which will not be dealt with in detail here. A suitable collision-free hash function for the Java API functions of the Java Card 3.0 or a subset thereof is for example:

Hash value=identifier [$i$]+(hash value<<6)+(hash value<<16)−hash value, where hash value=32 bits (unsigned) with initial value 0, and i is the index of the character 0 . . . n−1 (in ascending order). The value n is the length of the respective identifier in characters.

The identifier can now be lossily compressed as follows. The ascertained hash value that maps the identifier in a collision-resistant manner consists of two hash values with 16 bits each, whereby the first 16 bits form the hash value over the package and the second 16 bits over the class, i.e. the last identifier part. There is thus described an identifier with 32 bits, i.e. 4 bytes.

The separate compression of the identifier is expedient specifically when the right method for a call is to be found in the case of interfaces that are implemented by a lossy compression of the identifier part of an API class. The parts of the identifier that are not lossily compressed belong to a second type of identifiers.

Thus, no identifiers with strings of char character are stored for the API functions on the chip card 2, but rather the identifiers are compressed and consist of the hash values.

In dependence on the subset of the identifiers and their length, up to 15 kBytes of memory in the semiconductor chip 21 of the chip card 2 are saved by such a compression. This memory area can be available additionally to the user.

Furthermore, with the applications to be loaded, the identifiers of API functions are replaced by the loader with those hash values that have already been applied upon the compression of the actual identifiers. In this way the size of the application is additionally reduced.

This way of compressing the identifiers has further positive effects. Upon the execution of the application no strings of char characters are now compared, but only the two hash values (=of compressed identifiers), which can be processed very well by the central processing unit CPU due to their small size (2*16 bits), considerably increasing the call speed or the access speed for the respective program code element.

A further increase of the call speed is obtained by the compressed identifiers (hash values) of the API functions being accordingly ordered. The compressed identifiers are stored in the memory area of the chip card 2 in an order according to their value. Upon a call of an identifier a binary search is now possible instead of a linear search, thereby increasing the call speed once again.

A linear search O(n) under n=1180 identifier parts requires, on the statistical average, 590 memory accesses, but a binary search O(log(n)) only 10.2 memory accesses. A binary search with a suitable estimate (O(log(log(n)))) at an approximately uniform distribution of the compressed identifiers requires, on the statistical average, only 3.35 memory accesses.

One conceivable attack on the chip card is that upon the programming of the application outside the chip card 2, the API functions are supplemented by program code elements contrary to the rules. These supplemented program code elements, for example classes or methods, are chosen such that collisions would arise on the chip card 2 in the case of the hash values. The identifier of the program code element java.lang.String.append would, upon a call, collide with a supplemented program code element java.anything.somewhere.somehow.

Upon a call of the supplemented program code element, the API function java.lang.String.append would nevertheless be executed. However, this is neither a problem nor a security hole, because the user must perform the supplementary program code element of the API function outside the chip card 2 intentionally and with a lot of technical knowledge, and in the case of a provoked collision only the existing Java API functions would nevertheless be called.

Through the lossy compression of at least a part of the identifiers there is obtained a considerable saving of memory space. The necessary memory space for storing the applications is reduced, because the calls of the API functions are now present as hash values with a 4-byte size and, additionally, faster program code elements calls are achieved. The execution speed is substantially increased in time-critical applications, for example in communication, in particular NFC. This does not require any change of the applications, the latter are simply processed faster and stored more efficiently.

The substantial advantage is that the system is compatible with the existing Java standard, because the compression is effected on the chip card 2 itself and has no effects whatsoever externally.

In FIG. 6 there is shown the construction of a chip card according to the invention. The construction corresponds substantially to the construction according to FIG. 1. Hence, there will hereinafter only be described the differences over FIG. 1. The central processing unit CPU now comprises a compression unit 4. This compression unit types the identifiers to be compressed. A first identifier type here is at least a part of an identifier which calls an API function. Such an identifier type must not be overwritten according to the Java standard, so that this first identifier type can be lossily compressed. A part of an identifier belongs to a second identifier type, on the other hand, when it can be overwritten and is therefore to be stored in a collision-resistant manner for obtaining a unique name space. Typing can also include further identifier types, for example there can be defined an identifier type where the identifier comprises an identifier part that belongs to the API functions but is nevertheless not compressed lossily. The definition of the type of identifiers is in principle not subject to any limits, the parameters therefor being: number, required degree of compression, call speed, etc.

After typing, a compression function is applied in accordance with the type at least to the part of the identifier. This compression function is either lossy or lossless, see description of FIGS. 4 and 5. When the compressed identifier is obtained, it is stored in the memory area of the chip card 2.

In FIG. 7 there is represented a table in which transferred identifiers are contrasted with identifiers compressed by a lossless compression method according to the invention. The identifiers serve to call program code elements. The identifiers that have been transferred to the chip card 2 are constructed according to FIG. 4 and identify here for example packages that call API functions. It is very easy to recognize that these 26 identifiers have a multiplicity of identifier parts which recur. Upon the lossless compression this redundancy of the identifiers is removed. For this purpose, the identifiers are stored in list form, which is indicated by the arrow.

A first list contains all occurring single words, see middle table. A second list contains the number of single words and the indices of the corresponding single words from the single word list and is represented in the third table.

Upon compressing of the identifiers the individual identifier parts are analyzed according to their single words. These single words are stored in the first list. Additionally, there is listed in the second list the number of single words and indices from the single word list.

In order that no separators need be employed upon storing of the compressed identifiers, the compressed identifier begins with the number of words that were originally contained in the total identifier.

With this lossless compression method it is possible to save up to 50% of the required memory requirement, because many single words recur.

This method is unique, and the list can be dynamically extended when further identifiers for calling program code elements are transferred and are to be compressed.

To accelerate the call of the program code elements, the hash values of the single words are additionally formed, and only the hash values of the single words are stored in the first list. The hash value is then employed for comparing whether a program code element is present on the chip card. No elaborate string comparison is now necessary for the comparison, which increases the call speed. This method saves memory requirement additionally.

This memory space optimization is now exploited, and the hash value of the transferred identifiers before compression is additionally stored. Thus, the hash values of the identifiers transferred later to the chip card 2 can be computed and compared with the hash values of the identifiers before compression. A match of the hash values then indicates that the program code element is already on the chip card. Should the hash value be ambiguous, the corresponding identifier parts must be generated in order to then compare the latter with the later transferred identifier.

As identifier parts there are to be stored for example class names. The parts of identifiers that identify class names are usually combined with the identifiers that identify packages. According to Java the combination is such that the last identifier part identifies the class of the identifier. In FIG. 8, left column, there are listed by way of example class names as they are transferred to the chip card 2. They normally begin with a capital letter. Hereinafter some possibilities will be given for how the single words can be obtained in the case of class names as identifier parts.

These class names are now analyzed according to capital letter. When a capital letter is found, a new word begins. If the capital letter is followed by a small letter, the search must be continued in the string until a new capital letter or a terminating character comes. If this is followed by a capital letter again, the word analysis is finished. Now a new word begins. If a terminating character follows, the word is complete.

If a capital letter is followed by a capital letter again, the analysis must be continued until the last capital letter is followed by a small letter or a terminating character. If a small letter follows, one must go back two letters and the word is to be terminated. If a terminating character follows, the word is complete. In this way the right column of the table represented in FIG. 8 is obtained. If the found word is already contained in the single word table, it is not stored again, but only the number and the index accordingly updated.

In FIG. 9 there are given examples of the ascertaining of hash values with respect to the transferred identifier part. The hash value consists here of 2×16 bits. A function that can ascertain such hash values is widely known in the prior art.

Subsequently, the identifier is scanned and compressed using the table from FIG. 9. The result can be seen in the table of FIG. 10.

In dependence on the number of single words in the table there can now be chosen a storage format in the chip card. If more than 256 single words are stored, but less than $2^{16}$ single words, the format of the compressed identifiers can be chosen according to FIG. 11.

In the memory area of the chip card 2 there are stored the hash values of the single words according to FIG. 9, the table of the identifier parts according to FIG. 10, and the compressed identifiers according to FIG. 11.

If further identifier parts are transferred to the chip card 2, the search for the hash value of the identifier is first begun. The hash values are not yet unique in the name space, but they already reduce the identifiers coming into consideration. Ideally only one identical hash value is stored, so that the identifier matches the compressed identifier. If an ambiguity of the identifier occurs at this point, all compressed identifiers coming into consideration must be decompressed, and a comparison over the decompressed identifiers be carried out.

A sample computation will make the memory space saving clear. First without compression. If 273 words are employed for Java class names that makes, in an example, 3864 characters without blanks, see approach in FIG. 8, left column of the table. The required memory space of the class names amounts to 3864 bytes without blanks+546 bytes of the hash values, i.e. altogether 4410 bytes.

If instead of the compression described in FIGS. 8 to 10 is applied, the class names are broken down into 218 single words, which corresponds to 1376 characters without blanks. The required memory space amounts to 1376 bytes of the words without blanks+273 bytes of the number of words+604 bytes of the compressed identifiers=a total of 2253 bytes. This results in a saving of 49% through the lossless compression.

Not represented, but not excluded by the idea of the invention, are identifiers that identify methods and parameter lists. These can likewise be losslessly compressed, as described in the method according to FIGS. 8 to 11. These compressed identifier parts for methods and parameter lists can then be stored in a third or fourth table. Alternatively, these identifier parts are likewise stored in the first and second tables.

| List of reference signs | |
|---|---|
| 1 | End device |
| 2 | Chip card, in particular Java Card |
| 21 | Semiconductor chip |
| 3 | Communication connection |
| 4 | Compression unit |
| API | Application Programming Interface, Java Card standard library |
| Applet1 | A Java application, executable program code |
| CPU | Central processing unit |
| EEPROM | Non-volatile memory area |
| I/O | Input/Output unit |
| JCRE | Java Card Runtime Environment |
| JCVM | Java Card Virtual Machine |
| Class1, 2 | Program code element within a Java package |
| Method1, 2 | Program code element within a Java class, function |

| List of reference signs | |
|---|---|
| Package1, 2 | Program code element within a Java application |
| RAM | Volatile memory area |
| ROM | Non-volatile memory area |

The invention claimed is:

1. A method for compressing an identifier of a program code element in a portable data carrier, the method comprising the steps:
   typing the identifier in the portable data carrier, wherein the identifier is at least of a first identifier type and a second identifier type;
   type-dependently applying a compression function at least to parts of the identifier and obtaining a compressed identifier, wherein a first compression function is applied to the first identifier type, wherein a second compression function is applied to the second identifier type, wherein a degree of compression of the first compression function is higher than a degree of compression of the second compression function, and wherein the step of applying the compression is effected in the portable data carrier; and
   storing the compressed identifier in a memory area of the portable data carrier, wherein the compressed identifier is configured to be called for executing the program code elements, wherein
   at least for a part of the identifier of the first identifier type, a lossy compression function is applied,
   for the second identifier type, a lossless compression function is applied, and
   the first identifier type comprises at least Application Programming Interface (API) functions (API) or a subset of the Application Programming Interface (API) functions.

2. The method according to claim 1, wherein the identifiers are structured hierarchically.

3. The method according to claim 1, wherein the lossy compression function is chosen such that no collisions occur with regard to a defined set of identifiers.

4. The method according to claim 1, wherein the identifier of the second identifier type is stored in list form, wherein a first list is a list of at least one of parts of the identifier and hash values of the parts of the identifier, and a second list is a list of the number of parts of the identifier and indices for the corresponding parts of the identifier of the first list.

5. The method according to claim 1, wherein the compressed identifier calls at least one of a package, a method, a class and a parameter list as a program code element.

6. A portable data carrier, configured to carry out the method recited in claim 1.

7. A semiconductor chip for a portable data carrier, comprising:
   a central processing unit (CPU) and a volatile and a non-volatile memory area (RAM, ROM, EEPROM), wherein there is provided in the central processing unit (CPU) a compression unit, wherein the compression unit is configured to compress the identifiers according to the method recited in claim 1, when executed by a processor, and wherein the compressed identifiers are stored in the volatile and/or non-volatile memory area (RAM, ROM, EEPROM) of the data carrier.

8. A method comprising:
   compressing an identifier in a portable data carrier, the step of compressing the identifier in the portable data carrier comprising the steps:
   typing the identifier in the portable data carrier, wherein the identifier is at least of a first identifier type and a second identifier type;
   type-dependently applying a compression function at least to parts of the identifier and obtaining a compressed identifier, wherein a first compression function is applied to the first identifier type, wherein a second compression function is applied to the second identifier type, wherein a degree of compression of the first compression function is higher than a degree of compression of the second compression function, and wherein the step of applying the compression is effected in the portable data carrier;
   storing the compressed identifier in a memory area of the portable data carrier; and
   calling the compressed identifier in the portable data carrier, wherein
   at least for a part of the identifier of the first identifier type, a lossy compression function is applied,
   for the second identifier type, a lossless compression function is applied, and
   the first identifier type comprises at least Application Programming Interface (API) functions (API) or a subset of the Application Programming Interface (API) functions.

9. The method according to claim 8, wherein the compressed identifier calls a program code element uniquely and is collision-resistant.

10. The method according to claim 9, wherein the program code element has identifiers of program code elements, and said identifiers in the program code elements being compressed according to a method comprising:
    typing the identifier of program code elements in the portable data carrier, wherein the identifier is at least of a first and a second identifier type, and
    type-dependently applying a compression function at least to parts of the identifier of program code elements and obtaining a compressed identifier of program code elements, wherein a first compression function is applied to the first identifier type, wherein a second compression function is applied to the second identifier type, wherein a degree of compression of the first compression function is higher compared to the second compression function.

* * * * *